US006958560B2

(12) United States Patent
Holzheu et al.

(10) Patent No.: US 6,958,560 B2
(45) Date of Patent: Oct. 25, 2005

(54) WINDING ARRANGEMENT FOR AN ELECTRIC MACHINE

(75) Inventors: Georg Holzheu, Schongau (DE); Ulrich Masberg, Rösrath/Kleineichen (DE); Michael Menhart, Holzhausen-Igling (DE); Andreas Gründl, München (DE); Bernhard Hoffmann, Starnberg (DE); Reinhard Rasch, Hechendorf (DE)

(73) Assignee: Temic Automotive Electric Motors GmbH (DE)

( * ) Notice: Subject to any disclaimer, the term of this patent is extended or adjusted under 35 U.S.C. 154(b) by 48 days.

(21) Appl. No.: 10/471,507

(22) PCT Filed: Feb. 15, 2002

(86) PCT No.: PCT/EP02/01647

§ 371 (c)(1),
(2), (4) Date: Mar. 11, 2004

(87) PCT Pub. No.: WO02/073773

PCT Pub. Date: Sep. 19, 2002

(65) Prior Publication Data

US 2004/0135457 A1 Jul. 15, 2004

(30) Foreign Application Priority Data

Mar. 9, 2001 (DE) .......................................... 101 11 509
Apr. 4, 2001 (DE) .......................................... 101 16 831

(51) Int. Cl.[7] .................................................. H02K 3/00
(52) U.S. Cl. .......................... 310/179; 310/71; 310/184
(58) Field of Search ........................... 310/71, 179–184, 310/201, 206, 208

(56) References Cited

U.S. PATENT DOCUMENTS

| | | | | |
|---|---|---|---|---|
| 4,309,634 A | | 1/1982 | Koroly et al. | |
| 5,196,752 A | | 3/1993 | Palma | |
| 5,231,324 A | * | 7/1993 | Kawamura et al. | 310/198 |
| 5,804,902 A | | 9/1998 | Hill | |
| 6,300,697 B1 | * | 10/2001 | Findeisen et al. | 310/68 B |
| 6,472,783 B1 | * | 10/2002 | Witthohn et al. | 310/68 R |

FOREIGN PATENT DOCUMENTS

| | | |
|---|---|---|
| JP | 2001-37131 A | 2/2001 |

* cited by examiner

*Primary Examiner*—Thanh Lam

(57) ABSTRACT

The invention relates to a winding arrangement for an electric machine with a polyphase winding, in which a plurality of coils or coil groups connected in parallel (50, 52, 54, 56) are connected with a conductor rail (40, 42, 44, 46). This makes it possible to connect the coil ends directly and without connecting pieces with the electric power supply. The conductor rails (40, 42, 44, 46) are preferably arranged at one or both face sides of the post of the electric machine below the slot openings, i.e., in the area of the back of the post.

Furthermore, the invention is aimed at an corresponding manufacturing method for a winding arrangement of a polyphase winding for an electric machine, in which the coils or coil groups connected in parallel (50, 52, 54, 56) of the winding are connected with one of the conductor rails (40, 42, 44, 46).

14 Claims, 15 Drawing Sheets

WINDING ARRANGEMENT FOR AN ELECTRIC MACHINE

CROSS-REFERENCE TO OTHER APPLICATIONS

This Application is a National Phase of International Application No. PCT/EP02/01647 filed on Feb. 15, 2002, which claims priority from German Patent Application No. 101 11 509.1 filed on Mar. 9, 2001 and German Patent Application No. 101 16 831.4 filed on Apr. 4, 2001.

FIELD OF THE INVENTION

The invention generally concerns windings for electric machines, and, by way of example, a winding arrangement for the stator of an electric machine with a polyphase winding with several phase branches.

BACKGROUND OF THE INVENTION

Electric machines (e.g. asynchronous or synchronous machines with a rotary or linear embodiment, in which “electric machines” refer both to engines and generators) are generally equipped with a winding. The current flowing through the machine generates a moving magnetic field causing the armature to move over the air gap between the stator and the armature. The winding is generally incorporated in the slots of a stator or rail armature, and usually runs parallel to or in a small angle with the rotational axis in the case of a radial field machine.

The number of phases of the winding of a polyphase alternating current machine generally corresponds with the number of branches, which usually cover several coils with one or more windings. Each coil generally lies with both so-called “coil sides” in the slots, whereas the so-called end windings connect the sections of the winding arranged at the face sides of the stator. The coils or serial connections of several coils (coil groups) of a branch are generally connected on one end with a power supply. On the other end, the branches are joined, for example, at the so-called neutral point. Alternatively, the branches could also be delta connected.

A branch often comprises several coils or coil groups placed in parallel in the slots at regular intervals along the perimeter of the stator or conductor rail, in which the ends of the coil connected with the power supply (e.g., with the three phases of a source of alternate current are generally also placed at regular intervals along the perimeter of the stator or conductor rail. The coil ends then generally have with longer conductor sections, which are pulled forward from the coil ends to a central connection area and connected with said connection area. Each conductor can have several connecting points, whereby the coil end would again be connected with the power supply by means of a longer connecting piece.

SUMMARY OF THE INVENTION

The invention relates to a winding arrangement for a stator of an electric machine with polyphase winding with multiple phase branches. The winding arrangement comprises coils or coil groups and conductor rails with at least one terminal. Each phase branch comprises a plurality of coils or coil groups connected in parallel. The conductor rails are located at least partly around the stator. At least one end of the coils or coil groups connected in parallel is connected with one of one of the conductor rails in such a way that said conductor rail forms a current conductor connecting the terminal with the parallel-connected coils or coil groups of a phased branch.

Other features are inherent in the disclosed products and methods or will become apparent to those skilled in the art from the following detailed description of embodiments and its accompanying drawings.

DESCRIPTION OF THE DRAWINGS

Embodiments of the invention will be described, by way of example, and with reference to the accompanying drawings, in which.

Figure 1:
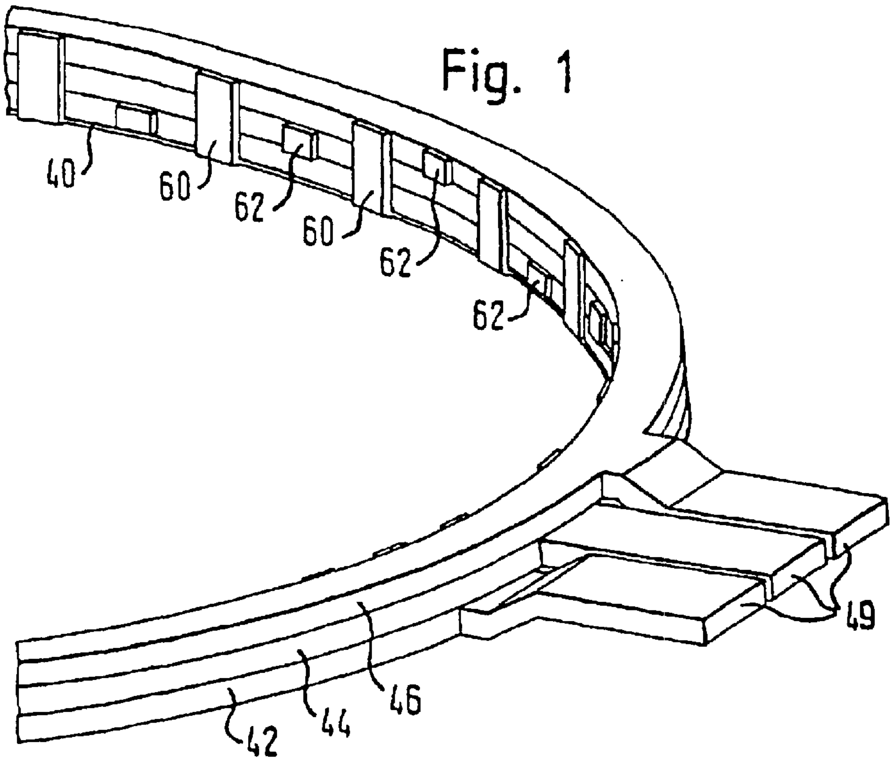
FIG. 1 is an exploded view of a first embodiment of a conductor rail unit.

Those parts in the drawings with the same or similar functions are in part marked with the same reference signs.

DESCRIPTION OF THE PREFERRED EMBODIMENTS

Figure 15:
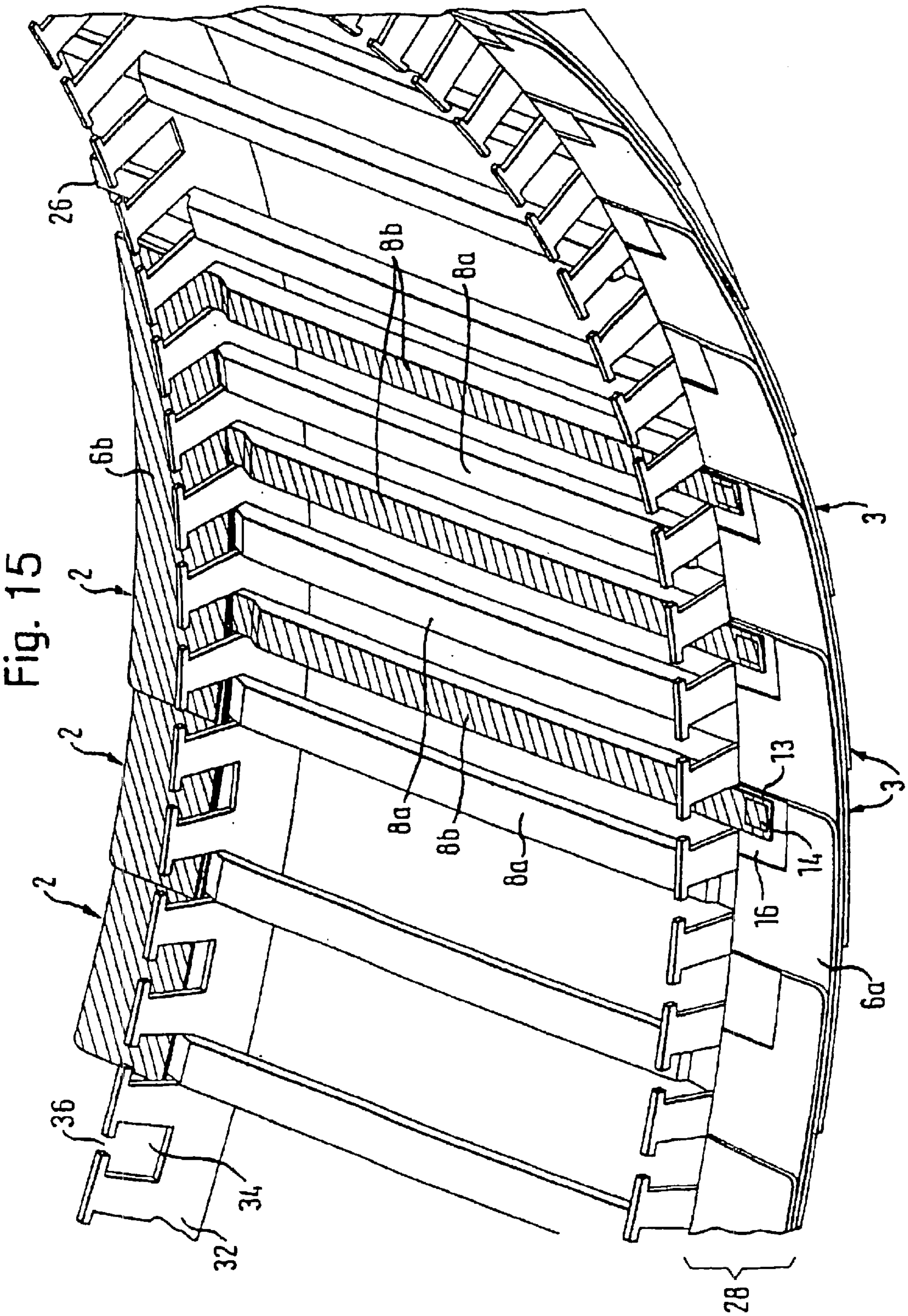
FIG. 15 is an exploded view of a section of a stator or armature of an electric machine with slots comprising L-shaped structural parts.
Figure 16:
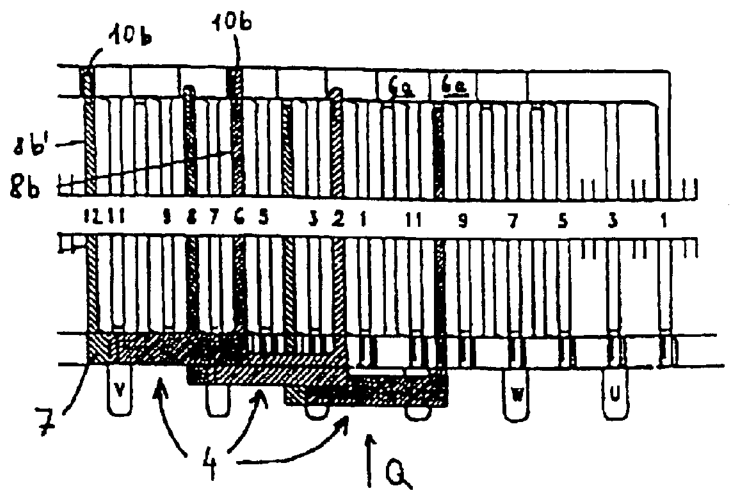
FIG. 16 is a diagrammatic top view of the slots of the body of a stator or armature provided with U-shaped structural parts.

The following clarification of the preferred embodiments with an arrangement of stator windings has been added for the purpose of simplification; this equally applies to the corresponding armature windings, in which the conductor rails also serve as collector rings, if necessary. FIGS. 15 and 16, for example, show equal views of a stator (in the case of FIG. 15, it is an interior armature machine) and an armature (in the case of FIG. 16, it is an exterior armature machine).

FIG. 1 shows a first embodiment of a conductor rail unit. Before clarifying this figure, here are some remarks concerning the preferred embodiments.

The preferred embodiments apply to the arrangement of windings for the stator of a radial field machine with an interior armature. Therefore, the lateral direction of the slot has been laid out as the axial direction, and the direction of the depth of the slot as the radial direction. However, the windings and conductor rails described can also be used for exterior armature machines. An axial field machine can also be equipped with a suitable conductor rail. The same applies to linear machines, in which the conductor rails rotate around the (leveled) stator.

The stator shown in the figures comprises a stator body in the form of a stack of slotted sheet metal in order to incorporate the winding slot bars guiding the magnetic flow. The non-slotted part creates the so-called backside. The "faces" refer to the sides of the stator body where the slots are cut crosswise. For the radial field machines shown, these are the axial foreparts of the stator body.

In the described embodiments of the arrangement and the manufacturing method for a winding arrangement of a multiphase winding, the winding is connected with a power source by means of rotating conductor rails comprising several coils or coil groups placed in parallel. They are favorably connected at regular intervals along the perimeter of the conductor rail, as prescribed by the winding diagram. This means that the coil ends are not connected with connecting pieces with central connecting points, but can be directly connected, e.g. by welding, under certain circumstances with the conductor rails. Therefore, the use of rotating conductor rails is also favorable in case of two different current paths between the power source and the coil end in each case. If the electric connection would be interrupted somewhere along the conductor, all coils or coil groups would still receive power from the second redundant current path.

The number of conductor rails used for the power supply of the described polyphase windings generally corresponds with the number of phases and—in the case of a star connection—a conductor rail for the star point, i.e., the connection of the phase conductors of the winding. The conductor rail for the star point is not needed for delta connected phases.

Following a preferred embodiment, the electric machine comprises a stator with slots, in which the conductor rails are arranged on one or both face sides of the stator in the direction of the depth of the slot below the slot openings. In other words, the conductor rails are located at the face side of the back of the stator, which secures the return of the magnetic current. Indeed, in the preferred embodiments of the winding, the winding heads are arranged in such a space-saving way that they do not require additional radial space at the face sides than provided by the depth of the slot. Consequently, the space at the back end of the stator is available for connecting the winding. By arranging the conductor rails at this location, the space available at at least one face of the stator can be completely used, thereby minimizing the axial expansion of the magnetic non-active space of the stator. Furthermore, the conductor rails are located in the immediate proximity of the coil ends.

The conductor rails can all be arranged at one face end, whereas other embodiments present at least one conductor rail on each face end. In this case, both face sides have one conductor rail for each phase, for example. In order to simplify the arrangement, the conductor rails mounted on the same face side are grouped in one component. In another embodiment, several conductor rails are arranged next to one another and connected with a conductor rail unit. In this case, the conductor rails are shaped like flat rings, for example, glued together on top of one another with insulating glue.

A conductor rail preferably comprises individual ring sectors. Indeed, if a conductor rail would be made in one part, e.g., sheet metal, much of the material cannot be used for other conductor rails; manufacturing individual ring sectors involves little waste of material. Alternatively, a conductor rail can also be manufactured by bending one single stick with an appropriate diameter.

Following another preferred embodiment, the winding comprises structural parts. On one side, these structural parts windings allow for a high slot-filling factor. On the other side, a suitable embodiment and arrangement of the structural part allows for compact winding heads, thus creating, for example, winding head arrangements in which the space at the back of the stator remains available and can be filled with the conductor rails.

The conductor rails are preferably directly connected with the structural parts of the winding. This is possible, in particular, when the conductor rails at the back of the stator are arranged below the slots and thus directly next to the winding heads. To this end, the conductor rails and/or structural parts building the coil ends are favorably equipped with suitable connecting pieces, e.g. in the form of links, which can be stacked and connected (e.g. welded) together.

In the described embodiments, the coil or coil group ends connected with the conductor rails are all arranged on the same side of the slot openings as the conductor rails, i.e., in the direction of the depth of the slot. This is accomplished by connecting two spiral-shaped coils in series, for example. At a certain moment, the current will then flow through one coil in the direction of the slot head, and through the other coil in the direction of the bottom of the slot.

The connections with the conductor rails are therefore either both located at the slot head or the slot bottom. If the conductor rails are located on the same side, the coil ends can be directly connected with said conductor rails. Individual coils (not connected in series), on the other hand, would require a connecting piece placed square across the winding heads from the head to the bottom of the slot, thus using axial space.

In some of the described embodiments, several or all conductor rails are layered next to one another in the lateral direction of the slots. This is particularly favorably when the conductor rails at the face side of the stator are located under the slot since they directly border the winding heads, thus making it possible to connect them in the shortest way possible with the winding. This can be done with special structural parts, in which the end of the slot bar is provided with an extended link reaching all the way to the conductor rails. "Slot bars" are those winding sections going through the slots and creating the coil sides; "connecting lines" are those sections at the face of the stator creating the end windings.

Said type of contact of the coil ends with coated conductor rails requires contact between each coil end and only one of the conductor rails, in which at least one of the conductor rails preferably presents elevations on the side facing the slot openings—i.e., the winding heads—connecting the coil ends. If a coil is contacted and welded to such an elevation through a link at the end of a slot bar, for example, the link is kept at a distance from the other conductor rails at the same time.

Alternatively, the conductor rails of other described embodiments are layered in the direction of the slot depth. Both alternatives, i.e., axial or radial layering of the conductor rails, preferably present at least one conductor rail with links extending across the other conductor rails and with whom coil ends are connected. These links may possibly replace corresponding links at the coil ends, thus eliminating the need for special structural parts connecting the winding of a structural part winding. In case of an embodiment with conductor rails layered in a radial direction, the links run along the other conductor rails in a radial direction all the way to the winding heads, where they are also kinked and connected with coil ends. In case of an embodiment with conductor rails layered in an axial direction, the links run over the other conductor rails, e.g. in an axial direction, thus creating a larger connection area on which the coil ends can be mounted and connected, e.g. welded.

Following a preferred embodiment, at least two coils of the winding are connected in series, whereby at least some connecting pieces create another conductor rail with several insulated sectors between coils connected in series. This conductor rail can be arranged in a radial direction between the winding heads and the remaining conductor rails, for example. They are preferably used in embodiments with each set of four coils connected in series and each pair of coils connected in series with a connecting piece layered on the side of the conductor rail turned away from the winding heads. The connecting pieces between two pairs of coils connected in series may then be arranged in such a way that a maximum of one connecting piece runs parallel with each spot of the perimeter of the stator. This way, the connecting pieces of a ring can include a series of mutually insulated sectors. This ring shall preferably be integrated in the conductor rail unit.

Following another embodiment, the winding comprises several overlapping coils composed of the slot bars located in the slots and the connecting lines located at the face sides of the stator, whereby the connecting lines are flatter than the slot bars and the connecting lines are interlocked by overlapping coils, and therefore layered.

Below follows a more detailed description of the winding shown in the preferred embodiments. The described conductor rails, can of course also be used for connecting any other polyphase windings.

The winding preferably comprises at least in part of L-shaped structural parts (L structural parts), in which one leg of the L structural part creates a slot bar, and another leg creates a connecting line basically running in the direction of the winding and perpendicular thereto. By connecting the bare end of the slot bar of a structural part with the bare end of a connecting line of another structural part, a connected winding is created (in the case of a preferred embodiment, this winding comprises spiral-like coils), in which two connected L structural parts each time create one coil winding.

Following another embodiment, the complete winding can be composed of only a few different structural parts. One embodiment uses only two different types of L structural parts—possibly besides the connection of the coils—whereby the legs of the connecting lines flatter than those of the slot bars. A first embodiment creates a connection within one and the same winding arrangement, whereas a second embodiment creates a transition of one winding arrangement into the next. The end of each slot bar leg of a preferred embodiment presents a flattened link; the flattened link and the flatter leg of one type of L structural part are both located at the same level as the bottom of the slot bar leg. A type 1 structural part presents one half of a coil winding, whereas a type 2 structural part completes the winding. Moreover, the connecting line of said structural part leads this coil into the next winding arrangement. By alternately connecting structural parts of types 1 and 2, a spiral-like coil is created.

Other structural part types can possibly be used in order to connect the above winding. It can, for example, include another structural part connecting two coils connected in series. This structural part is preferably U-shaped and made of two slot bar legs and a connecting line section, which is flatter than the slot bar leg. Another structural part can be used to connect the coil with a power supply. Certain embodiments use another type of L-shaped structural part with a connecting line leg which is flatter than the slot bar leg and having an extended flattened link at the end of the slot bar leg. In other embodiments, said links are located directly at the conductor rails, allowing to connect the winding with a standard type 1 or 2 structural part.

In yet another embodiment, the connecting lines of overlapping coils are internally staggered with at least one complete winding. In said embodiment, the connecting lines are arranged in layers and preferably shaped flatter than the slot bar, e.g. so flat that the arrangement of connecting lines belonging to a winding arrangement of the different overlapping coils is not thicker than one slot bar. The coils can be composed of any number of windings when several such arrangements of internally staggered connecting lines are placed on top of one another.

The examples shown present a winding with interlocked connecting lines made of L-shaped structural parts. In other embodiments (not shown), such winding can be made of individual slot bars and connecting lines (I structural parts), C-or U-shaped structural parts, or structural parts already comprising a complete winding (O structural parts) when being mounted, for example.

In order to make the winding at the face as space-saving as possible, it has been deemed favorable to create the winding following a winding scheme with the fewest possible number of staggered winding heads running beside one another. A simple example would be an alternate current winding with one slot per pole and branch (single-hole winding), having only two staggered winding heads at a time. The situation is different, for example, for windings with multiple slots per pole and branch (multiple hole windings), used to create a more favorable field flow, preferably similar to a sinus-shape. A two-hole alternate current winding comprises four staggered winding heads on each face side, for example.

The winding of the described embodiments has a fractional pitch in order to reduce the number of winding heads rotating past one another in multiple hole windings. The coil width of a fractional pitch winding is smaller than the pole pitch. The "pole pitch" refers to the distance expressed in the slots between two magnetic poles. The slot width indicates the required number of slots between the first and the second coil side. The preferred embodiments have a pole pitch 6, but a coil width of only 5. This means that the end windings of the coils are shorter than those in a non-fractional pitch winding since they only have to bridge four instead of five slots. Consequently, the winding sections at the faces are shorter and therefore take up less space, thus reducing the resistance loss. In the case of the rotary two-slot winding shown, the pitch of the winding allows to run only three instead of four end windings in an interlaced pattern, for example. This type of fractional pitch winding pattern is extremely favorable for structural part windings in the sense that it allows for a compact end winding area. It can, however, be used for windings made of wire arrangement offering corresponding advantages.

The windings shown in the preferred embodiments have several spiral-like coils, in which two coils are connected in series in such a way that the current in one coil runs through the spiral in the direction of the slot head, and the other in the direction of the bottom of the slot. The connecting lines of the coils are flatter than the slot bars layered on top of one another at a slant angle in respect to the connecting line between both slots, and connected with the slot bars. A spiral-shaped coil is formed, for example, when the connecting lines from one face connect slot bars of the same arrangement, and the connecting lines on the other face connect slot bars from radial by superimposed layers. This type of winding can be made of L-structural parts, for example. In principle, other structural parts (e.g., U-, C-, I- or O-shaped) or wire-wound coils can also be used.

The serial connection of the two spiral-like coils shown allows the connections to the conductor rails to be arranged either at the bottom or at the top of the slot, in other words, both on the same side of the connecting line. This is especially favorable when the conductor rail stack is also placed on this side of the connecting line.

By and large, the described embodiments use the space at the face of a stator in a space-saving way, thus particularly allowing for a limited axial expansion of the magnetic non-active volume of the stator. Moreover, the preferred structural part winding has a high space factor, resulting in a high torque density. The preferred embodiments are therefore especially suitable for motor vehicle crankshaft starter-generators. This involves an electric machine serving as a starter and generator, and located concentrically on the crankshaft of a combustion engine and firmly connected with this winding, preferably without interstage transmission. Because of the limited rebound space, the axial expansion of a starter-generator is rather small; on the other side, the direct starting method requires an elevated torque.

Returning to FIGS. 1–7, these figures show different conductor rail embodiments. The conductor rails run around the stator allowing to connect several coils or coil groups placed in parallel along the perimeter. The current flow through the current supply of conductor rails is generally higher. Therefore, the diameter of the conductor rails is relatively large in order to minimize the resistance losses. Consequently, the conductor rails take up a lot of space. In order to limit the axial expansion of the stator as much as possible, the conductor rails in this area in the examples shown are arranged in a radial way next to the slot openings on one face of the stator. The surface at the face remains bare anyway in the compact winding head arrangement described above, and this space-saving arrangement can therefore be used for the current supply. The conductor rail sets are therefore particularly suitable for connecting the winding described above. However, they can be combined with any winding, in principle.

FIG. 1 shows an example of an arrangement of the conductor rails for a rotary current winding according to a first embodiment. As mentioned, the conductor rails are arranged in the direction of the slot depth below the winding heads and in this case connected with connections 49 with the rotary current source. The conductor rails shown in FIG. 1 are laterally layered on top of one another, i.e., the axial direction of the slots, in such a way that each conductor rail ends up directly adjacent to the radial inside of the winding heads. The joints 60, 62 connecting the branches with the conductor rails are therefore arranged on the radial inside of the conductor rails. The winding can therefore be directly connected, for example welded or soldered, to the conductor rails 40, 42, 44, 46 without any other connecting pieces, for example when the winding consists in part of special structural parts 3 with extended joint bars 26 at the slot bar end reaching all the way to the joints 60, 62 (see FIG. 10).

It should be guaranteed, however, that each extended joint bar 26 contacts only one of the conductor rails 40, 42, 44 or 46. For this purpose, the joints 62 of the conductor rails 42, 44, 46 are equipped with an electric insulating coat with windows, offsetting one another in such a way that each joint bar 26 contacts no more than one window. According to another variant shown in FIGS. 1, 3 and 4, the current rings at the contact points 62 show elevations, so-called welding bulges 63, sticking out radially to the inside. If an extended joint bar contacts a welding bulge 63 and is welded to it, the joint bar is kept at a distance of the other conductor rails at the same time. The welding bulge 63 is stamped for example into the conductor rails 42, 44, 46 by pressing the conductor rails 42, 44, 46 in an axial direction at those spots where a welding bulge 63 is required, thus creating a bulge 63 from displaced material on the radially inwards facing side of the conductor rail. The displaced material could, for example, be shaped like a protruding banner (see FIG. 4).

Figure 2:
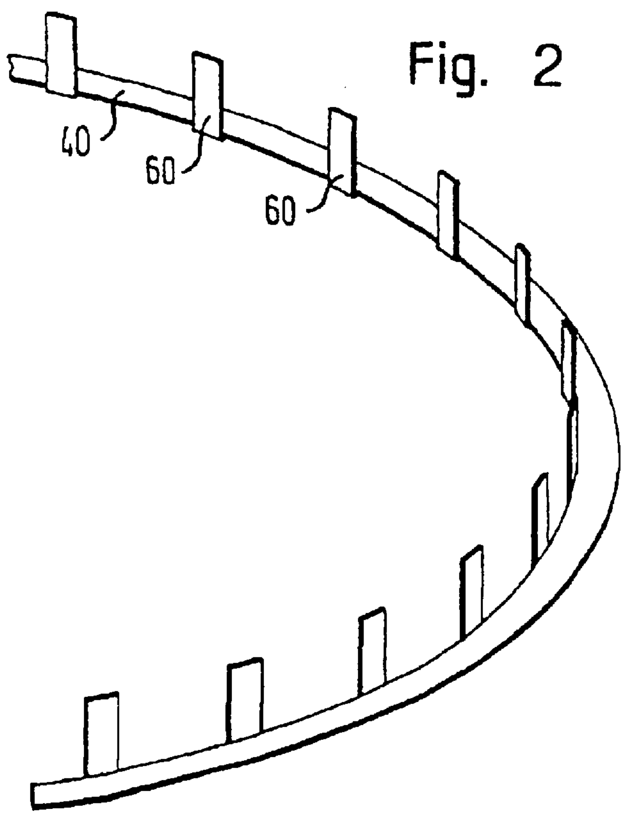
FIG. 2 is an exploded view of the conductor rail viewed from the front of FIG. 1.
Figure 3:
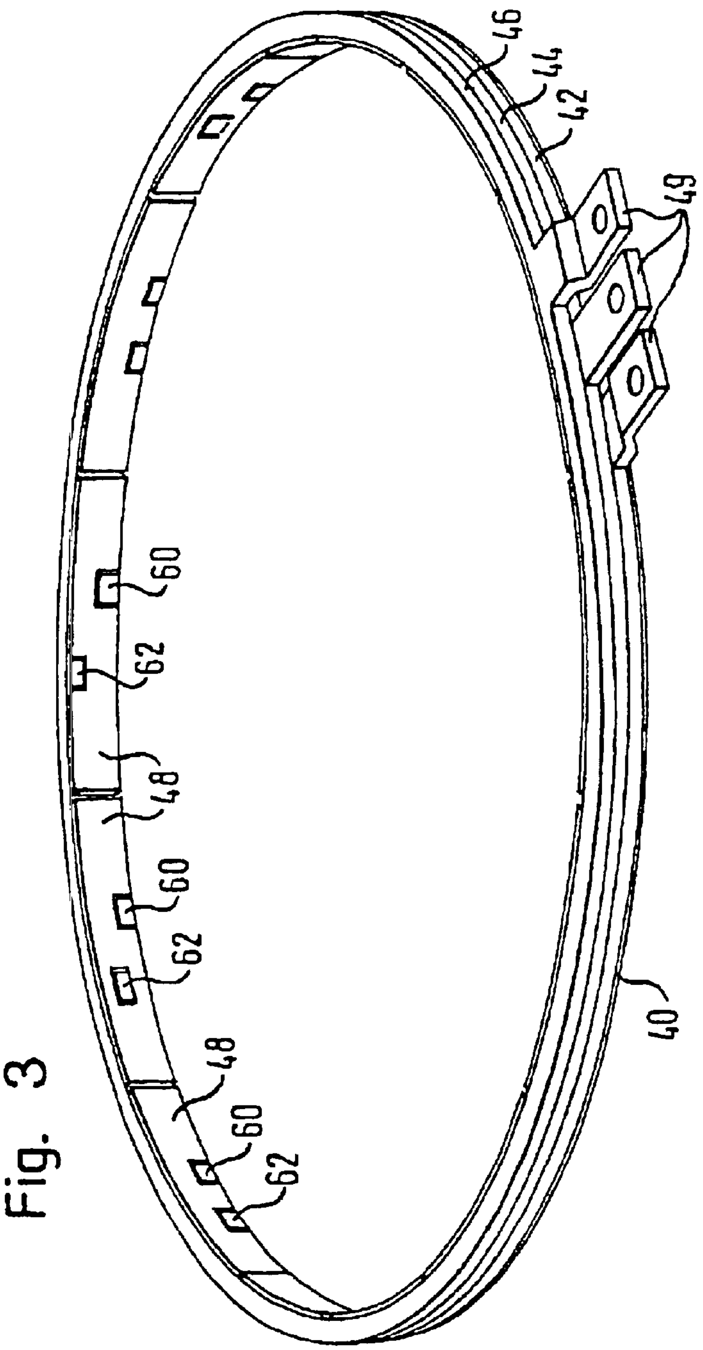
FIG. 3 is an exploded view of another embodiment of the conductor rail unit of the invention.

If need be, the winding is not only connected with the conductor rails for the current supply, but also with a conductor rail connecting three branches, the so-called star point. Alternatively, the branches can also be delta connected, thus eliminating the need for conductor rails for the star point. Since the current in the three phases of a rotary current source are de-phased by 120° to one another, the sum of the currents flowing in the star point nearly equals zero at any time. For the sake of saving space, the conductor rail for the star point 40 therefore has a smaller cross-sectional area than the conductor rails 42, 44, 46 for the current supply, i.e., the cross-sectional area is axially thinner than the other conductor rails 42, 44, 46. The star point conductor rail 40 in the example shown in FIG. 1 is too thin to weld a structural part of the winding on the inner radial area of a structural part of the winding. Therefore, it has joint bars 60 instead of welding bulges 63 extending in an axial direction over the radial inner area of the other conductor rails. The extended joint bar 26 of a structural part 3 could be welded on these joint bars 60, for example. For the sake of clarity, FIG. 2 presents the conductor rail for the star point 40 with the joint bars 60 without the other conductor rails.

The conductor rail unit shown in FIG. 1 is suitable for connecting a threephase winding with any winding layout. The conductor rail unit shown in FIG. 3, on the contrary, is very suitable for connecting the rotary current winding with four coils each connected in series. It has the same components as FIG. 1, in particular three axially layered conductor rails 42, 44, 46 connecting the winding with the electric current supply. These conductor rails all have joints 62 shaped as welding bulges 63, as well as a conductor rail 40 for the star point, which is equipped with joint bars 60 extending over the radial interior surface of at least one of the conductor rails. It additionally has another rail, a sector piece conductor rail 48 arranged on the radial inner side of the conductor rail set; the joints 60 and 62 of the remaining conductor rails 40, 42, 44, 46 are accessible through the corresponding recesses in the sector conductor rails 48 and put in contact with the winding. The sector piece conductor rail 48 is not continuous, but comprises sector pieces insulated electrically from one another. They create the connecting pieces marked as 48 in the winding arrangement of FIG. 19 between two pairs of coils connected in series. For this purpose, the extended joint bars 26 of structural parts 3 of the coils 52 and 54 belonging to the different coil pairs are welded with both ends of a sector 48.

Following yet another embodiment, the conductor rails are layered in a radial direction as shown in FIG. 5*a*, and not in an axial direction. Only one conductor rail 46 is arranged directly at the winding heads in this arrangement, whereas the other conductor rails 42, 44 do not have direct access to the winding. Therefore, all conductor rails have joint bars 61 protruding radially to the inside over other conductor rails or over the winding heads, if necessary. The winding is connected for example by bending the end of these joint bars 61 to the inside, and welding the extended joint bar 26 of a structural part 3 to the bent end. This embodiment also allows for arranging a conductor rail 48 subdivided in sectors in a radial direction on the inside of the conductor rail unit, or arranging a conductor rail for the star point in a radial or axial direction over the other conductor rails 42, 44, 46.

Figure 6:
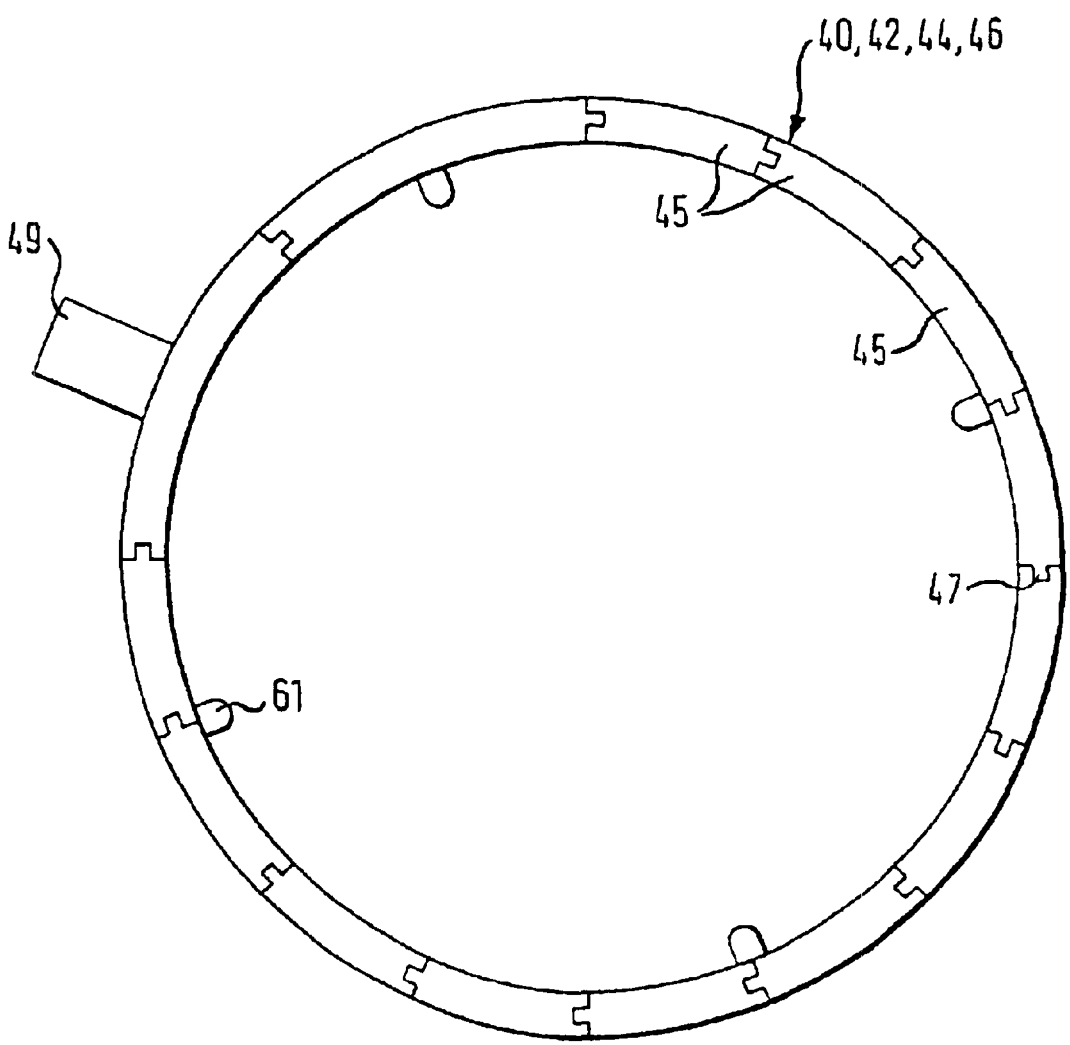
FIG. 6 is a diagrammatic top view of a conductor rail.

The conductor rails could be made of rings cut out of sheet metal, for example. This results in quite a bit of waste however. Therefore, it is preferred to make the conductor rails of bent bars with an appropriate cross-section or individual ring sectors. FIG. 6 shows such a conductor rail 40, 42, 44, 46 made of individual ring sectors 45. Press fitting is preferred method to connect the ring sectors 45 at the connecting parts 43, whereby oversized extensions 47, for example, are pressed in corresponding recesses in the sector ends. This results in the joints between the sector being airtight, thus protecting them against oxidation. The conductor rails are favorably turned into a unit in such a way that the joints between the sectors of interlaced conductor rails are offset, thus increasing the stability of the conductor rail unit.

Figure 7:
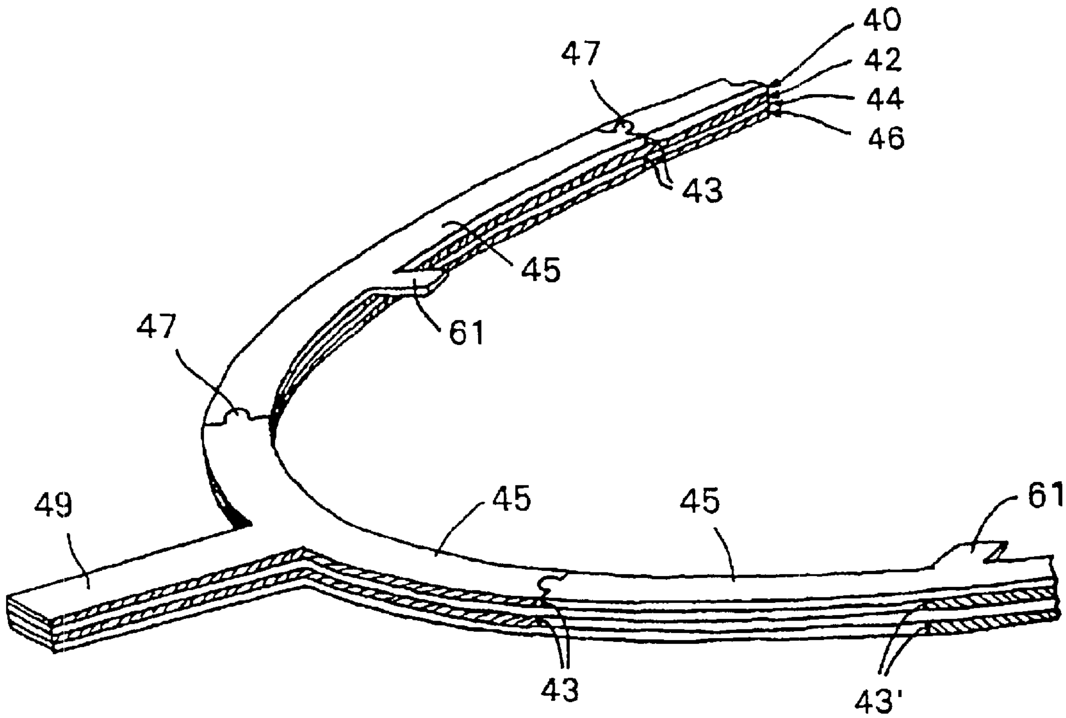
FIG. 7 is an exploded view of an embodiment of a conductor rail comprising different ring sectors.

FIG. 7 shows such a conductor rail unit comprising four ring-shaped conductor rails, 40, 42, 44, 46, composed of individual sectors 45. The joints 43, 43' between the sectors of the different conductor rails are offset to one another. In the example shown, for example, the joints 43 between the sector of the conductor rails located on top of the drawing are located directly over the joints 43 between sector of the second conductor rail from the bottom, whereby joints 43' between sectors of the second conductor rail from the top and the bottom are offset by one half sector length. This enhances the mechanical stability of the conductor rail unit. The embodiment of FIG. 7 only shows the top conductor rail 40 for the front links 61; in other embodiment examples, the remaining conductor rails are also provided with corresponding links contacting the coil ends.

There are different methods for connecting the conductor rails 40, 42, 44, 46 with a conductor rail unit. On one side, the connection secures the mechanical stability and simplified arrangement of the conductor rail unit; on the other side, it can also create an electric insulation between the conductor rails at the same time. This is the case, for example, when the conductor rails are connected with a glue containing a filler such as glass beads, which keep the conductor rails separated. An alternative insulation means would consist of placing paper between the rails, subsequently gluing it with an appropriate glue, and pressing the conductor rails together. The glue is preferably temperature-resistant in order to avoid possible heating of the conductor rails because of resistance losses. Following another alternative, the conductor rails have an insulating coat such as a back coat. This is a coat with glue-like characteristics when heated. Each conductor rail is coated with a back coat, assembled into one conductor rail unit and subsequently heated, thus melting together the different coats of the conductor rails.

Below is a description of embodiments of windings, which are preferably connected with the described conductor rails. These windings comprise, for example, a structural parts winding mainly composed of L-shaped structural parts. The conductor rails described above are of course also suitable for connecting any multiphase winding.

FIGS. 8–11 provides a detailed description of all the structural parts used for the preferred winding.

Figure 8A:
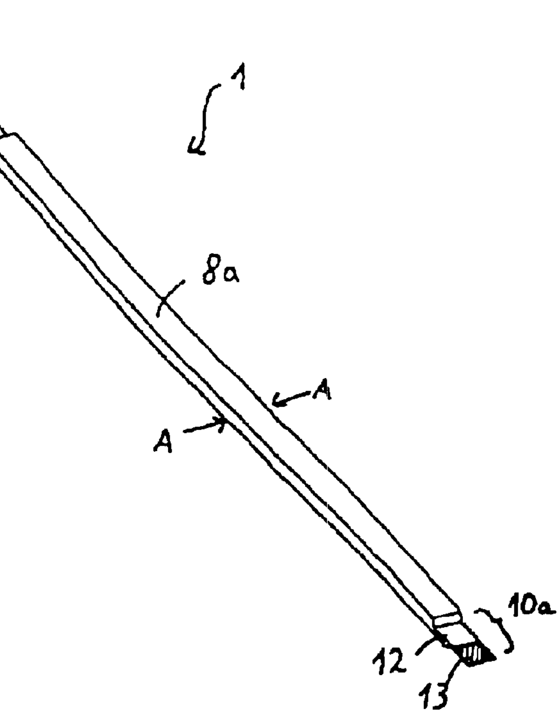
FIG. 8*a* is a perspective view of a first type of L-shaped structural part.

FIG. 8*a* shows an exploded view of a first type of L-shaped structural part. One leg 8*a* of the L-shaped structural part 1 creates a slot 8 in the finished winding, and the other leg 6*a* is located at the face of the stator and connects slot bars 8 located in different slots. The slot bars and joints are generally marked with reference numbers 8 and 6, respectively, whereas the slot bar legs and connecting line legs of the different structural parts are referred to as 8*a*, 8*b*, and 6*a*, 6*b*, respectively.

Figure 8B:
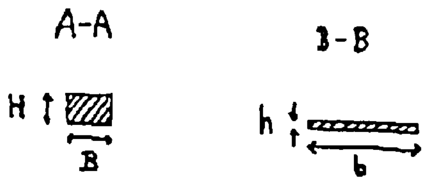
FIG. 8*b* shows Cross-sections along the A—A and B—B lines of FIG. 1.

The connecting lines 6 are flatter and wider than the slot bars 8, as shown in the cross-sections of both legs 6*a* and 8*a* in FIG. 8*b*. The slot bars 8 actually have a thickness H and a width B, whereby the width B in the embodiments shown has been determined to allow for several slots bars in one slot next to one another, i.e., at the same height from the slot bottom. The thickness h of the connecting line 6, for example, is one third of the thickness H of the slot bar 8, whereas the width b is about three times the width B of the slot bar 8. This means that the cross-section of the line in both legs of the structural part shown is about the same.

The structural part 1 has a flattened joint bar 10*a* at the bare end of the slot bar 8*a*. The joint bar 10*a* of the first type shown in FIG. 8*a* lies at the same height as the connecting line 6*a*, i.e., on the bottom side of the slot bar leg 8*a* in the drawing. This means that the (invisible) bottom side of slot bar 8*a* of the connecting line 6*a* and a slot bar 8*a* located close to the transition region 12 of the joint bar 10*a* are at the same level. The thickness of the transition region 12 of the joint bar 10*a* is about the same as that of the connecting line 6*a*, i.e., approx. one third of the thickness of the slot bar. The far end of the joint bar 10*a* presents a connecting region 13, which is flattened even more compared with the transition region 12, i.e., to about one sixth of the thickness of the slot bar. The transition between regions 12 and 13 is made with a step at the lower side of the joint bar 10*a*. The connecting region 13 thus leaves a clearance at the bottom side of approx. one sixth of the thickness of the slot bar compared with the height of the bottom side of the slot bar 8*a*.

Two structural parts are connected by placing the connecting area 13 of the joint bar 10*a* at the end of the connecting line of a second structural part. The connecting area 13 is then connected, e.g., welded, to the connecting line of the second structural part. Therefore, the connecting region 13 of joint bar 10*a* does not have an insulating coat, just like the joint 16 at the end of the connecting line 6. This is marked in the drawing with a shaded line. Structural part 1 and all other structural parts, which are not marked with a shaded line have an insulating coat. In order to make sure that the connecting layer located in the densely packed end winding area between two structural parts is not thicker than a connecting line 6, the joint 16 of the connecting line 6*a* has been flattened to about half the thickness of the connecting line 6*a*. This way, the joint bar connecting region 13 can be placed and welded to a joint 16 without exceeding the thickness of the connecting line 6 at the connecting region. Since the thickness of the transition region 12 (which has been kept as short as possible) and the actual connection is only about one third of the slot bar 8*a*, it comes with a cross-section contraction. This is accepted in favor of a densely packed end winding arrangement of the connecting line. The transition region 12 can be advantageous since it creates a distance between the slot bars and the end winding. The cross-section of the line should be as big as possible. The transition region 12 could also be arranged as a continuous transition between the slot bar and the connecting region 13. In other embodiments where the transition region 12 has been omitted, the connecting region 13 is directly connected with the slot bar 8.

Figure 9:
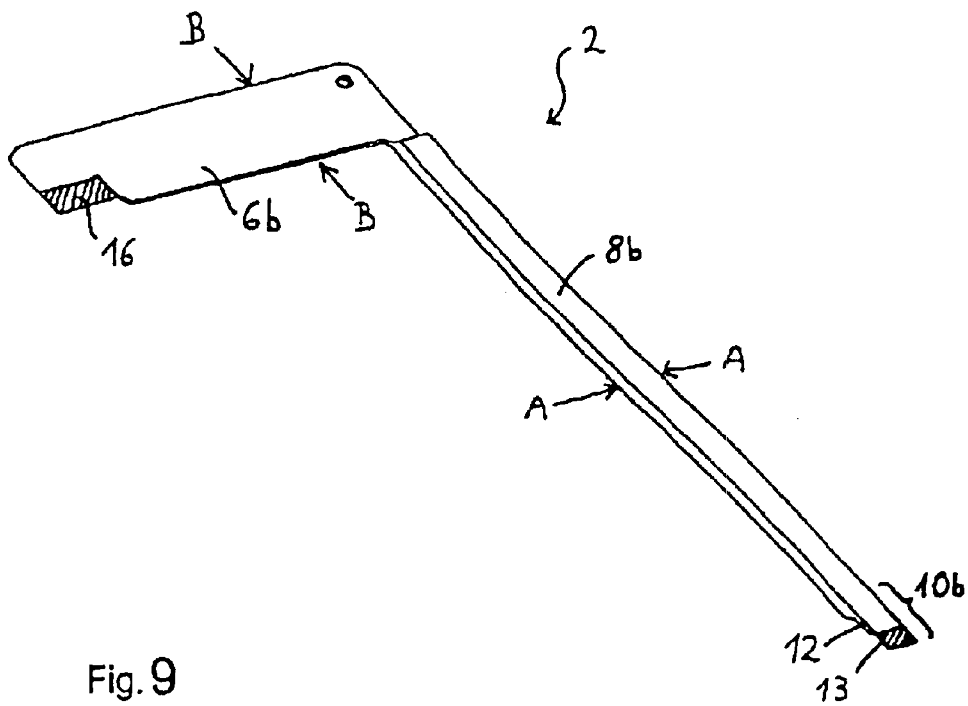
FIG. 9 is an exploded view of a second type of L-shaped structural part.

FIG. 9 shows a second type of a L-shaped structural part 2 used to create a complete winding of a spiral coil in combination with the first type. Structural part 2 basically has the same embodiment as structural part 1, i.e., the lengths and the cross-sections B—B and A—A of the connecting lines 6*a*, 6*b* and joint bars 8*a*, 8*b* of both structural parts are the same. Structural part 2 also has a flattened joint bar 10*b* at the bare end of the slot bar 8*b*. Contrary to the slot bar 10*a* of structural part 1, the flattened joint bar 10*b* is not located at the same height as the connecting line 6*b*, but offset with the opposing area of the slot bar 8*a*. The joint bar 10*b* of structural part 2 is actually located at the height of the side (located on top in FIG. 9) of slot bar 8*b*, whereas the connecting line 6*b*—just as in structural part 1—is located at the same height as the bottom side of the joint bar 8*b*. For the rest, the joint bar 10*b* of structural part 2 is laid out the same way as joint bar 10*a* of structural part 1, i.e., it has a transition region 12 directly following the slot bar 8*b* and about as flat as the connecting line 6*b*, and yet another flattened connecting region 13 at the outer end of the joint bar 11. This region 13 is so flat that its thickness together with the thickness of the flattened joint 16 of a connecting line 6 is about the same as the thickness H of a connecting line 6. The step between transition regions 12 and 13 is located at the downwards pointing side of the entire joint bar 10*b* in such as way that the top side of the entire joint bar 10*b* is located at the same height as the top side of joint bar 8*b*.

Figure 10:
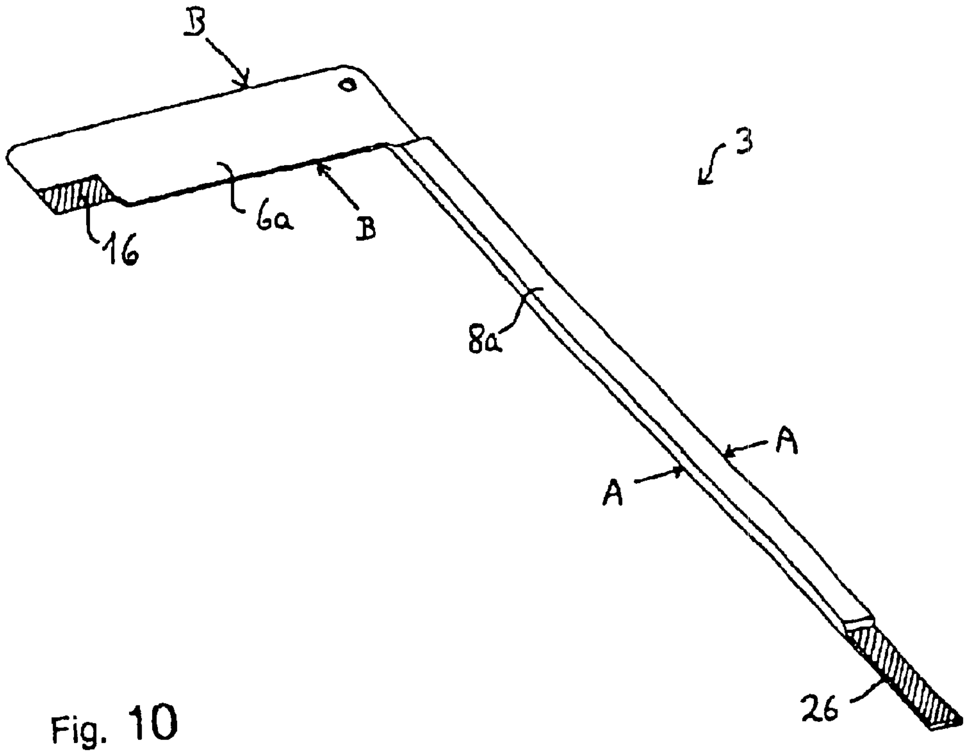
FIG. 10 is an exploded view of yet another type of L-shaped structural part.

FIG. 10 shows a third type of L-shaped structural part 3, used to connect the winding with the conductor rails. Structural part 3 is basically the same as structural part 1, but comes with an extended joint bar 26 instead of joint bar 10*a*. This extended joint bar 26 is connected, e.g., welded, to a conductor rail and is therefore not insulated. The thickness of slot bar 26 is preferably the same as the thickness h of a connecting line 6. Structural parts 3 are favorably located in the lower winding arrangement of the slots, bordering the extended joint bars 26 directly to the conductor rails placed below the slot bars, if need be. Another option would be to place the structural parts 3 in the top winding arrangement.

In another preferred embodiment, the joint bars are placed on the conductor rails in order to connect the winding with the conductor rails. In this case, no special structural parts 3 of the third type are needed and the joint bars 10*a* of the structural parts 1 of the first type, for example, are welded on the extended joint bars 26 of the conductor rails.

Figure 11:
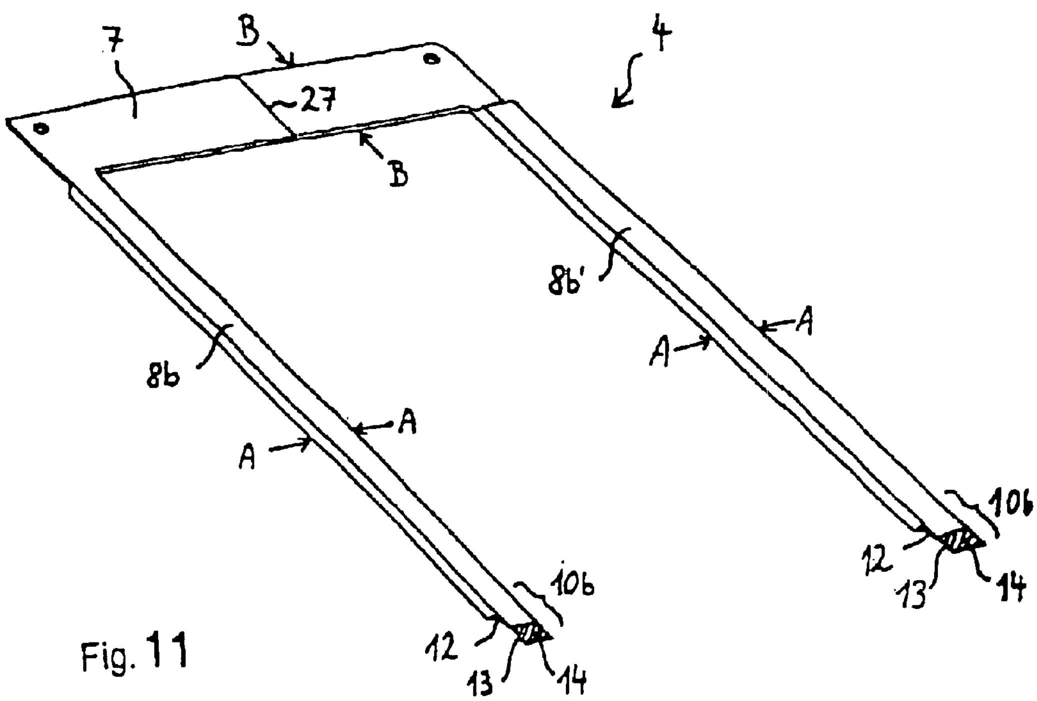
FIG. 11 is an exploded view of yet another type of U-shaped structural part.

Finally, FIG. 11 shows a type of U-shaped structural part used to create a serial switch for two spiral-shaped coils of one winding. The U-shaped structural part 4 has two slot bar legs 8*b*, 8*b*'. The length and the cross-section A—A of these slot bar legs are the same as those of the slot bar legs 8*a*, 8*b* of structural parts 1 and 2. Both slot bars 8*b*, 8*b*' have a flattened joint bar 10*b* at the bare end. This joint bar 10*b* is located in the drawing at the topside of the slot bar 8*b*, 8*b*', respectively, and therefore corresponds with the slot bar 10*b* of the L-structural part 2. The connecting line 7 connecting both slot bars 8*b*, 8*b*' has the same cross-section B—B as the connection lines 6*a*, 6*b* of structural parts 1 and 2. It is, however, one slot length longer. If the connecting lines 6*a*, 6*b* of the structural parts of the first and the second type are, for example, long enough to create a coil with slot bars 8 within a distance of five slots, the connecting line 7 of the U-structural part is extended by connecting two coils, here for example in such a way that both slot bar legs 8*b*, 8*b*' end up at a distance of six slots from one another. Another typical detail of the connecting line 7 is that it is not located at one and the same level relative to both slot bar legs 8*b*, 8*b*'. It is rather located at the height of the top side (in the drawing) of a slot bar leg 8*b* on one side, yet on the other side at the height of the bottom side of the other slot bar leg 8*b*'. If both slot bar legs 8*b*, 8*b*' of a U-structural part in a finished winding present in the same winding arrangement, the U-structural part consequently lies at a slight slant angle with both slot bars 8*b*, 8*b*' to the connecting line between both slots. The ends of the connecting line legs of these L-shaped structural parts are flattened, as indicated with a welding 27. The U-shaped structural part can be made of two L-shaped structural parts, for example, with flattened areas at the end of the connecting line legs. These flattened areas are placed on top of one another and welded together.

Figure 12:
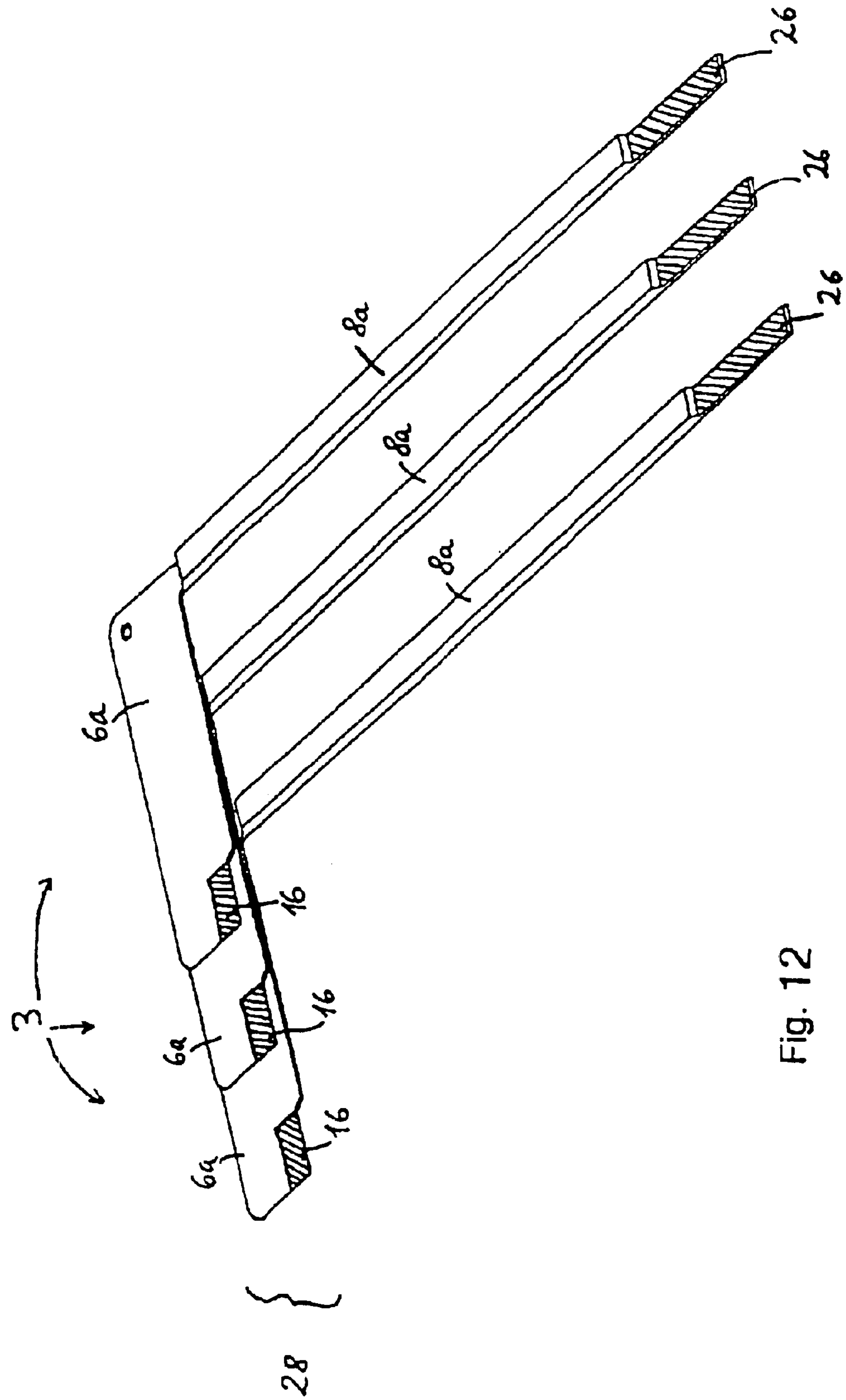
FIG. 12 is an exploded view of an arrangement comprising several L-shaped structural parts.

Next, the construction of a winding with overlapping coils made of L-structural parts will be described as per FIGS. 12 through 14. These figures show the composition of the bottom winding layer with few structural parts. For the sake of simplicity, the structural parts are presented without a stator lying down on a flat surface. In case of a stator body of a radial field machine, the structural parts would be located on the interior sheath surface of a cylinder. FIG. 12 shows three type 3 L-shaped structural parts with extended joint bars. The structural parts 3 are located in the winding arrangement right at the bottom of the slots and placed in an offset pattern two slot lengths apart, so each second slot of slot bar 8*a* contains one structural part 3. The extended joint bars 26 are all located at the same face of the stator body and connected with the conductor rails (not shown) underneath. The connecting lines 6 on the other side of the stator body are placed on top of one another in a scaled pattern, thus creating a layer 28 of connecting lines. Inside the layer of connecting lines 28, the connecting lines are layered in such a way that the bare end is always located in the upper part of this layer and the joint 16 is exposed and accessible, whereas other connecting lines 6*a* cover the other end. The transition between the connecting lines 6*a* and the slot bar 8*a* of the same L-structural part 3 is covered with other connecting lines 6*a*. The transition between the connecting lines 6*a* and the slot bar 8*a* of the same L-structural part 3 is located in the covered area.

As the drawing shows, the connecting layer 28 contains three connecting lines 6*a* on top of one another. Since the thickness h of the connecting lines 6*a* in the embodiment shown is about one third of the thickness H of the slot bar 8*a*, the connecting line layer 28 is nowhere higher than the corresponding layer of slot bars 8*a*.

In the example shown, the connecting lines 6*a* connect slot bars every five slots, as clarified below. In other embodiments (not shown), the connecting lines connect slot bars at a bigger or smaller distance so there are also more or less three connecting lines on top of one another in one connecting line layer. The thickness h of the connecting lines 6 is favorably selected in such a way that the thickness of each connecting line layer 28 corresponds with the thickness H of a slot bar 8. Other embodiments, which do not specify a certain structural connecting part for the conductor rails, use structural pieces of the first type in the first arrangement steps following FIG. 6.

Figure 13:
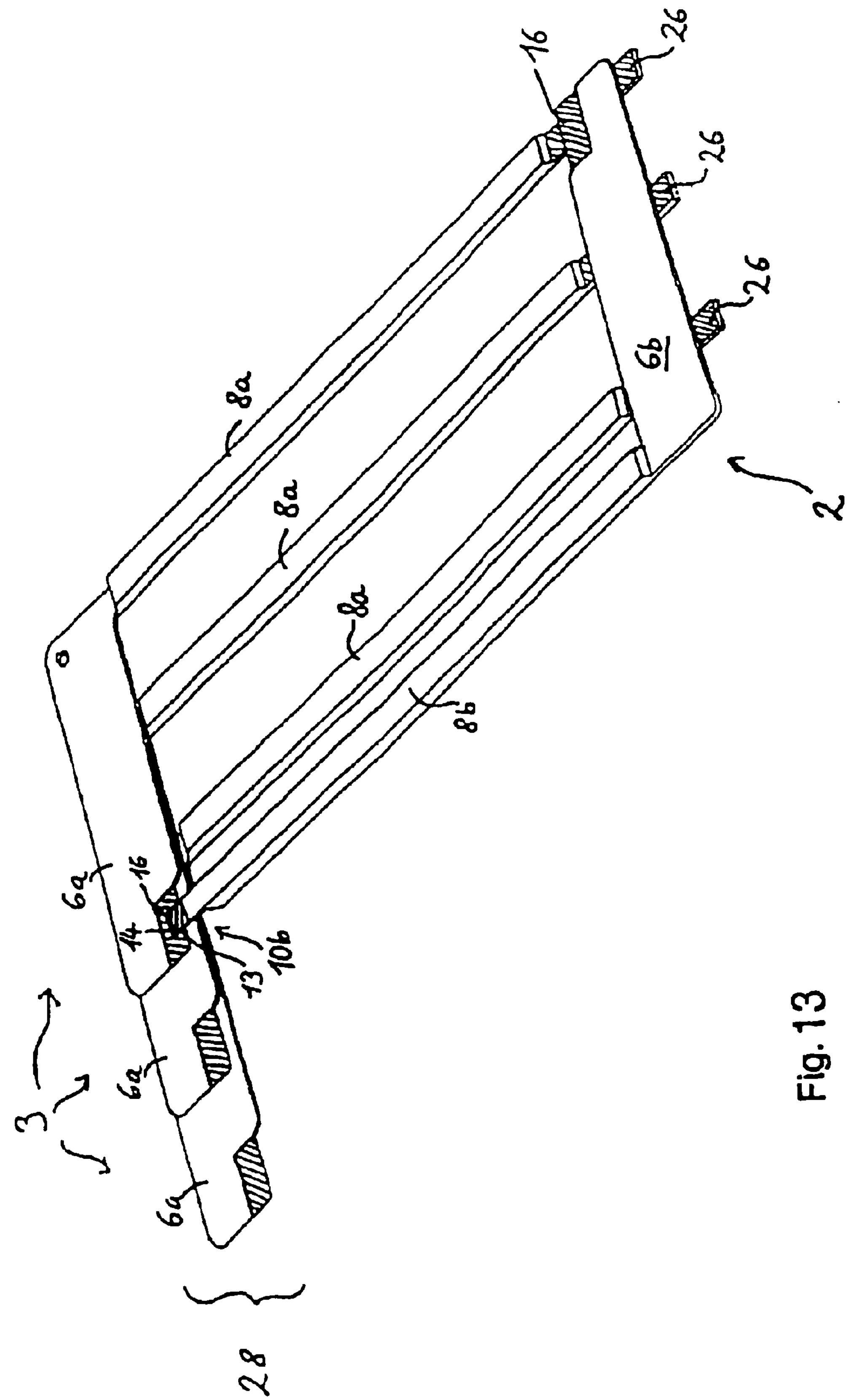
FIG. 13 shows the same view as FIG. 12, however, with an additional L-shaped structural part.

Once each slot has a structural part 3 of FIG. 12, each remaining slot is filled with one structural part of type 2 in such a way that its connecting line 6*b* ends up on top of the connecting lines 6*a* of the structural parts 3 inserted previously and located on the opposing face of the stator (see FIG. 13). The connecting region 13 of the flattened joint bar 10*b* of structural part 2 thus ends up on the flattened joint 16 of the connecting line 6*a* of structural part 3. The structural part 2 is connected with structural part 3 in this location, i.e., by welding with a laser beam. A laser beam with adequate energy is pointed at the exposed surface 14 of the connecting region 13 of the joint bar 10*b*, melting the material of the connecting region 13 of the joint bar 10*b* and merging it with the underlying joint 16 of the connecting line 6. Alternatively, there is a groove in area 13 of the joint bar 10*b*, enabling to point the laser beam directly through this groove at the edge between the end of the joint bar 13 and the joint 16 underneath. In this case, the laser beam does not have to melt the entire thickness of the end of the joint bar 13. The extended links 26 of the structural parts 3 may also be welded to the conductor rails.

Since the connection area 13 of the joint bar 10*b* of structural part 2 is located at the level of the top of the slot bar 8*b* as clarified in FIG. 9, the slot bar 8*b* of structural part 2 ends up in the same winding arrangement as the slot bars 8*a* of the structural parts 3 when it is placed on top of the connecting region of the connecting line 6*a*. This eliminates the difference in height caused by the scaled pattern at a slant angle of the connecting lines 6*a* in the connecting line layer 28.

At the opposite face, the connecting line 6*b* of the structural part 2 is also placed at a slant angle, i.e., at the covered end at the same height as the extended joint bars 26 of structural parts 3. From this point to the bare end, it is only covered over this joint bar.

Figure 14:
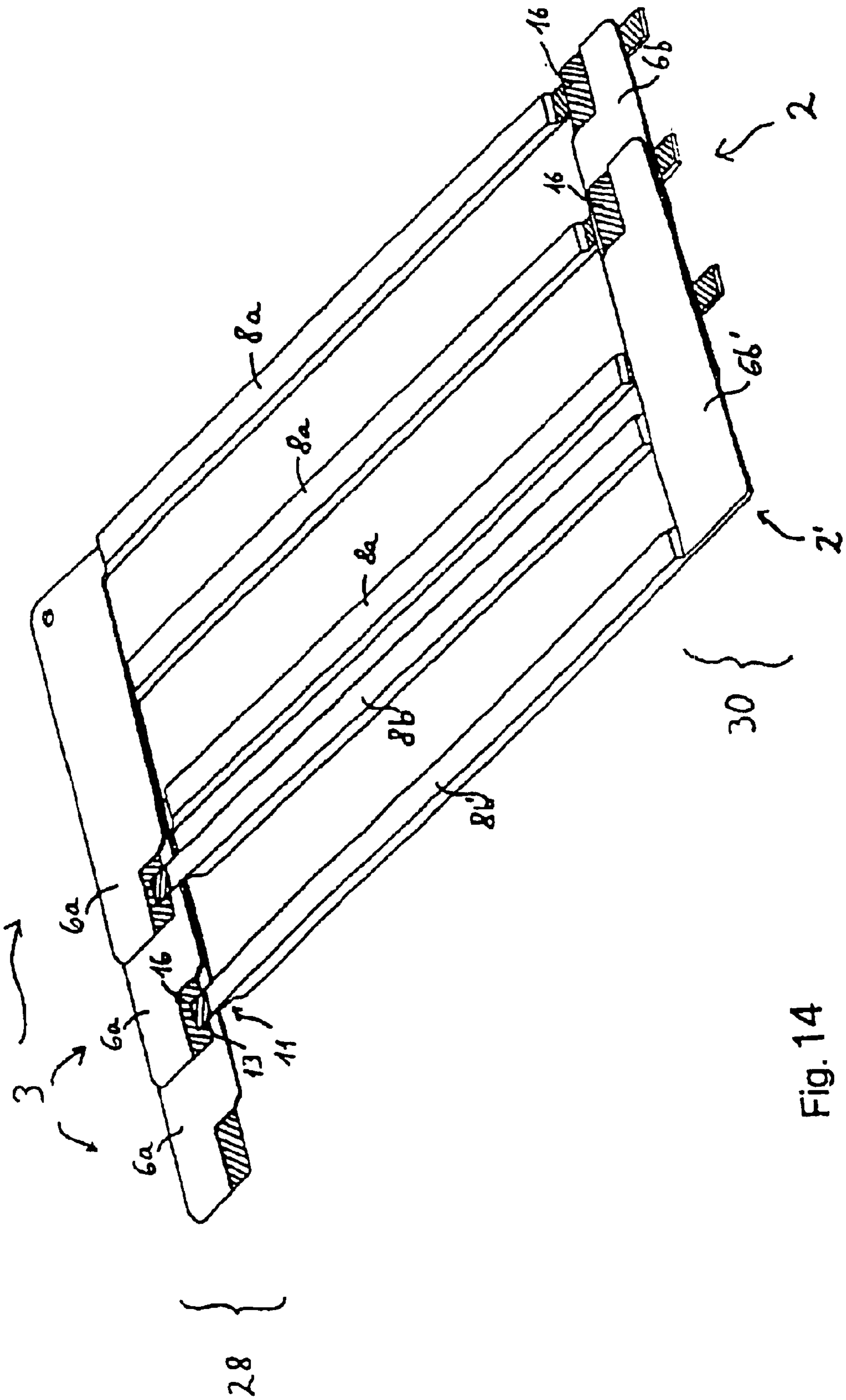
FIG. 14 shows the same view as FIG. 13, with yet another L-shaped structural part.

FIG. 14 shows the same winding arrangement as FIG. 13, with an additional structural part 2' corresponding with structural part 2. Structural part 2' is connected the same way as structural part 2, i.e., with the end of its joint bar end area 13 at the end of its slot bar leg 8*b*' with the joint 16 of structural part 3. It is connected on the opposite side with the connecting line 6*b*' in a layered scale-like pattern over the connecting line 6*b* of structural part 2 in such a way that the joint 16 ends up over the slot bar end of structural part 3 connecting the joint bar end area 13 of structural part 2'.

A complete winding arrangement of slot bars 8 is created by placing additional structural parts 2 and 3 in each second slot in accordance with FIG. 14. The connecting lines of structural parts 2 and 2', respectively, then create a second connecting line layer 30 similar to layer 28 on the other face. Each bare end of connecting lines 6*a*, 6*b* of the structural parts 2, 3 faces upwards in these layers in such a way that the joints 16 are not covered by connecting lines of the same layer. Each connecting line layer 28 and 30 is layered at a slant angle in such a way that the connecting line 6*b* (in the exploded view of the drawing) runs from the bottom left to the top right, and the connecting lines 6*a* from the bottom right to the top left.

Welding structural part 2 to the matching structural part 3 creates a complete winding of a spiral shaped coil. The connecting line 6*b* of structural part 2 layered at a slant angle takes the winding to the next-higher winding layer. The spiral is extended by putting a structural part 1—not shown in FIG. 14—on structural part 3 of the first winding. This creates the beginning of the new winding layer. The connecting area 13 of joint bar 10*a* thus places structural part 1 on the joint 16 of the corresponding structural part 2 and is connected with it as described above. Since the slot bar 10*a* of structural part 1 is located at the level of the bottom of the slot bar 8*a* of structural part 1, the height difference created in the connecting line layer 30 resulting from the slant layering is not leveled out, but ends up creating a spiral instead. Structural parts of type 1 are placed on all structural parts 3 in order to create a complete winding. These type 1 structural parts are again welded on the corresponding joints 16 of the structural parts 2. Additional structural parts 2 are placed in the remaining slots, i.e., each second slot on top of the structural parts 2, and then welded to the joints 16 of structural parts 1, thus completing this second winding arrangement. The connecting lines of structural part 1 create another connecting line layer 28. The composition of this layer is the same as the connecting line layer 28 of structural parts 3 shown in FIG. 14. Once the second winding layer has been installed and connected, several interlaced coils each having two windings with connecting lines staggered in one another have been created.

Figure 17:
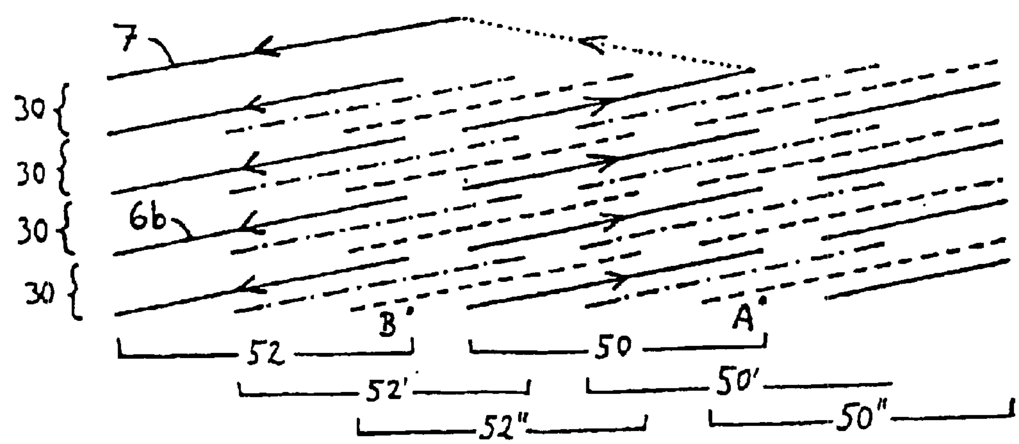
FIG. 17 is a diagrammatic view of the face side of a spooled body of a stator.

FIG. 17 shows a diagrammatic view of the staggering of the connecting lines of interlaced coils. This figure shows a diagrammatic top view of the faces of a spooled stator. The face surface of the connecting lines 6*b* is marked in a simplified way with lines. The connecting lines 6*b* are arranged in four slant layers 30 on top of one another. The connecting lines 6*b* of the different branches are marked with different lines, e.g., the connecting lines of branch V with continuous lines, the connecting lines 6*b* of branch W with dash-dotted lines, and the connecting lines of branch U with a dashed line. The different branches alternate within one connecting line layer 30, creates Spiral shaped coils 50, 52, 50', 52', 50", 52" with staggered connecting lines are created by layering multiple similar layers and the corresponding connections between the structural parts of these layers. Each connecting line 6*b* of a layer 30 belongs to another coil. The connecting lines of branch V, for example, belong to coils 50, 52, those of branch W to coils 50', 52', and those lines of branch U to coils 50", 52". Coil 52" overlaps coils 52, 52' on one side, and coils 50, 50' on the other side.

On the opposite face, the connecting lines 6*a* are arranged accordingly, with the difference that each connecting line 6*a* of the layer 28 connects slot bars from winding layers lying on top of one another, which results in them passing into the next-higher winding layer after each winding.

The end winding arrangement of FIG. 17 can also be used for windings which are not composed of L-structural parts, but of any other random structural parts. In principle, the end windings of wire-wound coils can also be staggered instead of evading in bunches at the faces. Even though FIG. 17 shows a three-phase two-slot winding, any random winding of an alternating or direct current generator can be created in such a way that the connecting lines of interlaced coils are staggered.

Figure 4:
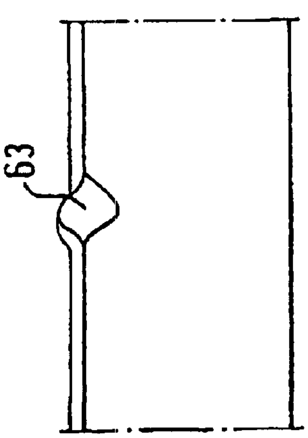
FIG. 4 is a diagrammatic view of a joint of a conductor rail.

Just like FIGS. 12 through 4, FIG. 15 shows a part of the winding layer located under the slots. The figure no longer shows an idealized leveled developed view, but a cutout of a bent stator 32 of a radial field machine in an interior armature embodiment (or an armature in an exterior armature embodiment) with structural parts 2, 3 placed in the slots 34. In order to make the actual winding better visible, the embodiment only shows the two face sides of the stator body 32. The stator body 32 is solid of course, and typically made of electric sheets axially layered on top of each other. This means that each face of the stator body 32 corresponds with the outer sheets of the armature stampings.

Structural parts 2, 3 are located inside the slots 34 directly above the bottom of the slot. The head 36 of the slots 34 is narrowed so the L-structural parts 2 and 3 can only be slipped in the slots in an axial direction. The face side seen from the spectator's point of view has already been put in a layer of structural parts 3, and three structural parts of type 2 have been put on the opposite face side.

Next, a manufacturing example of the method used to create a circuit of coils connected in series is clarified on the basis of FIG. 16. Said figure shows a diagrammatic top view of the slotted side of a stator or armature—one should picture the stator or armature body cut open again and wound off in one tier. The narrowing of the slots at the slot head is not shown here, which allows a full view of the top winding layer in the slots. The slots are all numbered from 1 through 12 since the winding arrangement used in this example is repeated every 12 slots.

In the stator shown in FIG. 16, L structural parts 1, 2, and, if necessary, 3, are placed in the slots of the stator or rail of FIGS. 12–14 and the number of layers is sufficient to fill all of the slots with slot bars, except for the top slot bar. Finally, only type 4 U-shaped structural parts instead of type 2 L-shaped structural parts are placed at the bottom part of the face. Each U-structural part 4 marked with a shaded line each has two slot bars **8*b* and 8*b*' located in the slots 2 and 8, 4 and 10, 6 and 12. This means that there is a slot bar leg of a U-structural part in every other slot. The connecting line 7 of the U-structural parts are also layered on top of one another in a scaled pattern on the lower face of the stator, just like the connecting lines 6 of the L-structural parts. The connecting lines 7, however, are all one slot distance longer than the connecting lines 6 of the L-structural parts. Consequently, the flattened joint bars 10*b* of the slot bars 8*b*, 8*b*' of the U-structural parts all end up on the bare ends of coils belonging to different connecting lines 6*a* of structural parts 1**, and are welded with a laser beam in this final step.

Inside each U-structural part, two spiral shaped coils are connected in series. The following is a detailed description of this in reference to FIG. 17. As mentioned above, FIG. 17 is a highly diagrammatic top view of one face side of a spooled stator. The face side in question corresponds with the lower face shown in FIG. 16. FIG. 17 shows the back of the connecting lines **6*b* placed on top of another in several layers 30. For the purpose of illustration, the current direction in one of the branches has been marked with arrows in the drawing. The branch U marked with a continuous line starts at point A with a connection to a conductor rail. From there, the branch is guided into a spiral shaped coil 50 to the slot head over four winding layers or four connecting line layers 30, respectively. The dotted line represents a connecting line 6 on the opposite face side of the armature. This connecting line 6 connects a U-structural part with the connecting line 7 running over the visible face side. Two coils 50 and 52 with an identical arrangement are connected in series through the U-structural part in such a way that the current flows through both coils in an opposite direction, in the directions of the arrows. Consequently, the current in the spiral shaped coil 52 depicted flows from the slot head to the slot bottom, whereas in coil 50, it flows from the slot bottom to the slot head. The branch is connected with the star point at point B. The other branches, depicted with dashed or dash-dotted lines, respectively, mark connections with the conductor rails as well as corresponding U-structural parts with connecting lines 7, which have not been marked in FIG. 17**.

Figure 18:
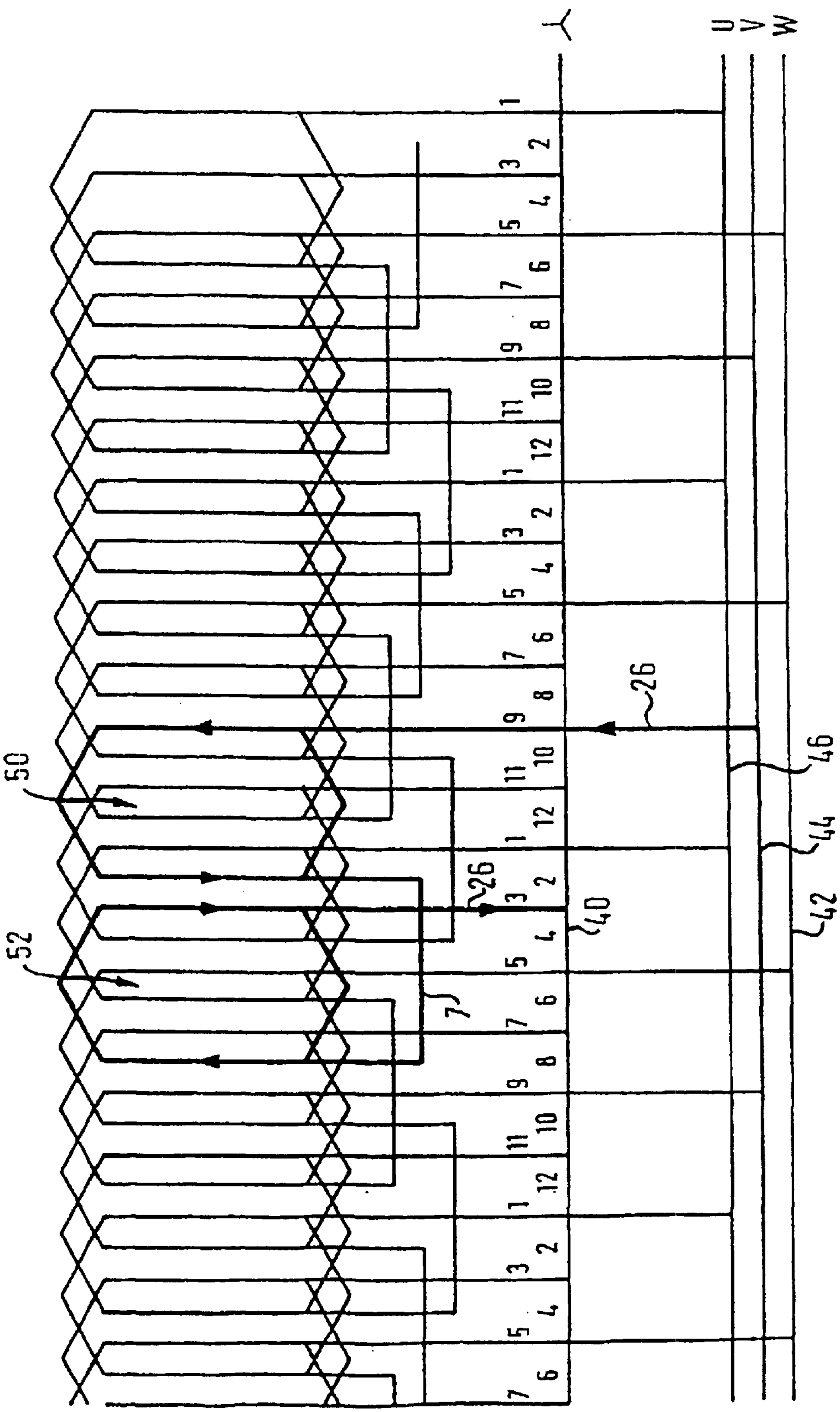
FIG. 18 is a winding diagram of a three-phase winding of a first embodiment.

FIG. 18 shows the winding arrangement for the winding shown in FIGS. 8 through 17. It shows how the individual coils are distributed over the slots of the stator, whereby this winding arrangement has only one coil side in each slot (single-layer winding). The winding arrangement is repeated every 12 slots. The winding is laid out as a three-phase winding (rotary winding) with two slots per pole and branch (two-slot winding). This results in a pole pitch of six, i.e., the distance between two poles is six slots. In case of a full-pitch winding, the coil width, i.e., the distance between both coil sides of a coil expressed in slots full-pitch winding, therefore also equals six. The coil width of the winding shown in FIG. 18, however, is smaller than the pole pitch, i.e., and equals five. Therefore this is a so-called fractional pitch winding. The fractional pitch results in the winding heads of no more than three coils are guided along one another at the faces of the stator. For the winding embodiments described above, this means that a compact winding head arrangement is obtained when the thickness h of the connecting line is one-third or smaller than the thickness H of the slot bars.

A branch V in FIG. 18 is printed in bold for the sake of clarification. The other branches U, W run accordingly. Branch V consists of two coils 50, 52 connected in series, which are presented here in a simplified way as closed rings whereas they actually are spirals with eight windings, for example. On one side, coil 50 is connected electrically with the conductor rail 44 for branch V, and on the other side with the coil 52 via a connecting piece 7 (which could be a U-structural part, for example) bridging six slots. This is connected with the conductor rail marked with a Y for the star point 40. The immediate current direction has been marked with arrows. Both coils 50, 52 are located in neighboring slots with their coil sides facing each other, in such a way that the current in both neighboring slots flows in the same direction. Each time, there are four coil sides of coils from other branches between the coil sides of a coil 50, 52.

The arrangement of the winding heads does not become clear from the winding arrangement of FIG. 18. If, however, the connecting lines are layered in a compact way as described above, there is hardly any spacing in the densely packed winding head arrangement. Therefore, the connecting pieces 7 necessary to connect two coils in series are either conveniently located at the slot head or at the slot bottom, i.e., at the edge of the winding head package. If the winding basically consists of spiral shaped coils (i.e., coils in which the connecting lines do not overlap in a radial direction), a connecting piece 7 connects two coils 50, 52 in series at once in such a way that the current flows in the direction of the slot head in one coil, and in the direction of the slot bottom in the other coil. However, since the above described layering of the connecting line is identical for both coils 50, 52, connecting piece 7 connects both coils 50 and 52 in series in such a way that the current flows in an opposite direction, i.e., negative phase sequence, through both spirals. As a result of this serial connection, the connections between the branches and the conductor rails for the current supply 42, 44, 46, as well as for the star point 40 automatically all end up on one radial side of the winding head package, actually on the other side of the connecting pieces. The conductor rails are also conveniently located on this side.

Figure 19:
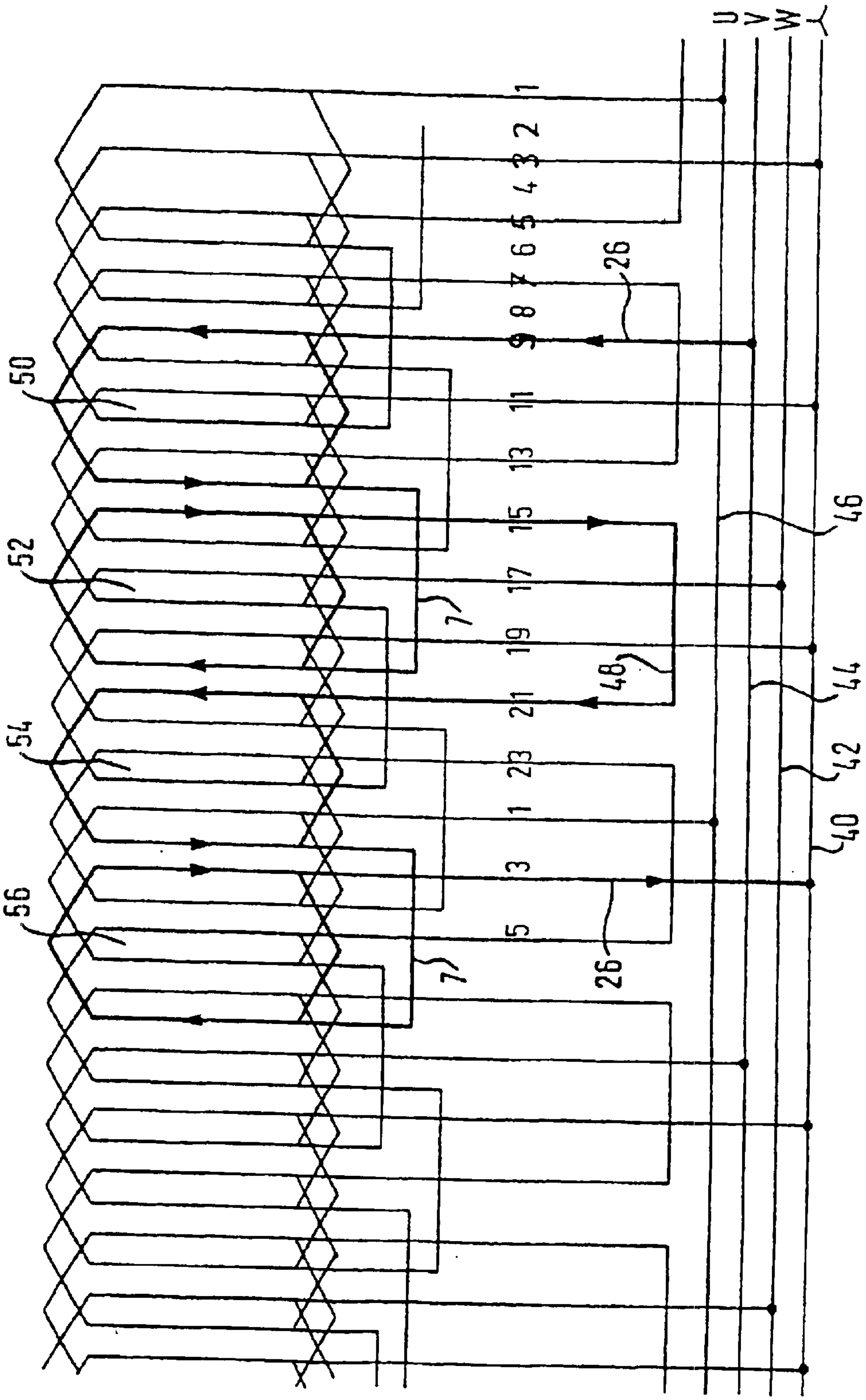
FIG. 19 is a winding diagram of a three-phase winding of a second embodiment.

An alternative consists of connecting four coils in series or another even number each time, as shown in FIG. 19. The winding arrangement of FIG. 19 is the same as the one of FIG. 18, with the only difference that two pairs of coils connected in series are again connected in series each time with another connecting piece 48. The connecting pieces 48 can be laid out the same way as the connecting pieces 7; following another layout, they create sectors of an additional conductor rail.

Figure 5:
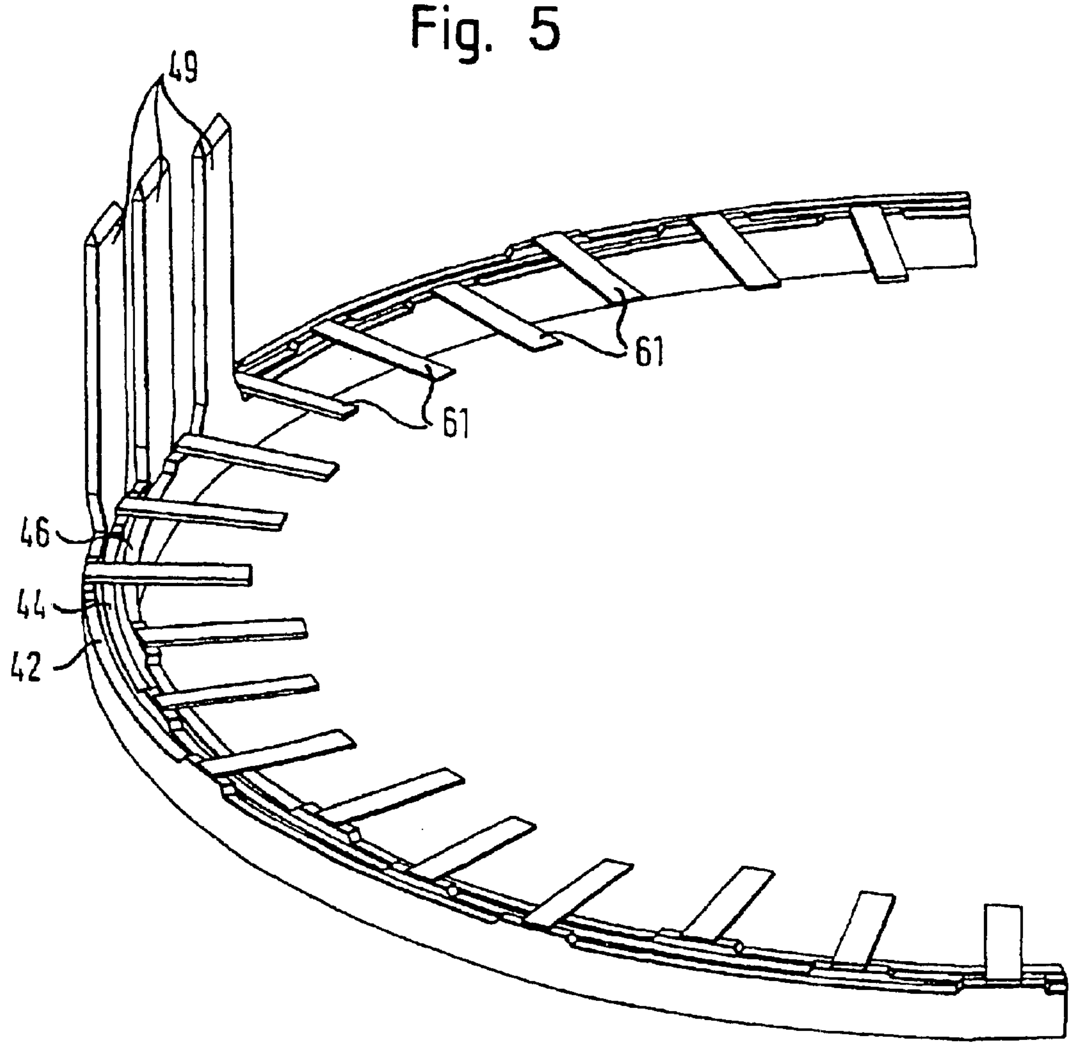
FIG. 5 is an exploded view of another embodiment of a conductor rail unit.
Figure 20:
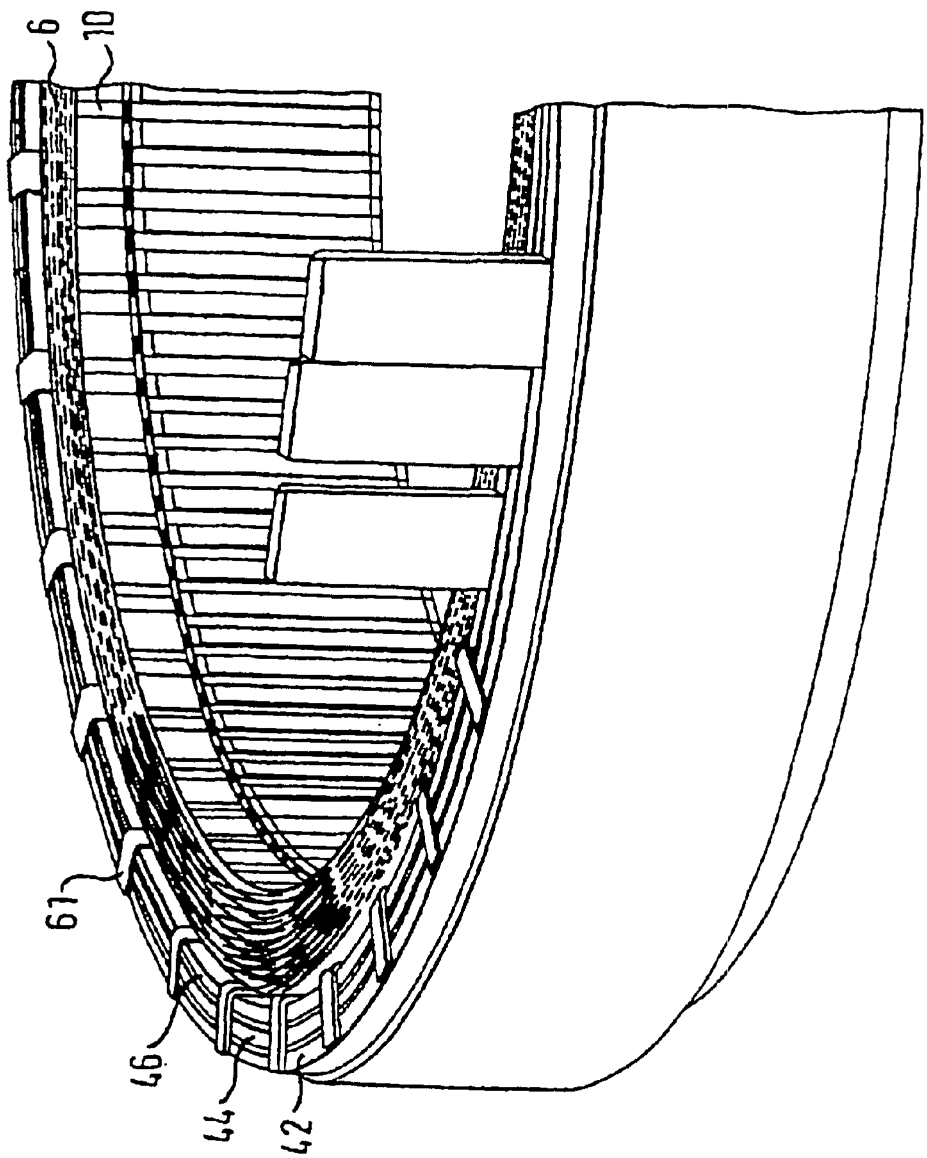
FIG. 20 is an exploded view of a section of a stator completely provided with a winding and a conductor rail set.

FIG. 20 shows a winding embodiment in a stator of an electric radial field machine with a conductor rail packet, corresponding with the one shown in FIG. 5. The space-saving use of the area at the face of the stator 32 becomes very clear here, as well as the staggered arrangement of the coils overlapping the connecting lines 6.

All publications and existing systems mentioned in this specification are herein incorporated by reference.

Although certain products constructed in accordance with the teachings of the invention have been described herein, the scope of coverage of this patent is not limited thereto. On the contrary, this patent covers all embodiments of the teachings of the invention fairly falling within the scope of the appended claims either literally or under the doctrine of equivalents.

What is claimed is:

1. A winding arrangement for a stator of an electric machine with a polyphase winding having a plurality of phase branches, comprising:

coils or coil groups, and conductor rails with at least one terminal, in which each phase branch comprises a plurality of coils or coil groups connected in parallel;

in which the conductor rails are located at least partially around the stator; and in which at least one end of the coils or coil groups connected in parallel is connected with one of the conductor rails in such a way that said conductor rail forms a current conductor connecting the terminal with the parallel-connected coils or coil groups of a phase branch.

2. The winding arrangement of claim 1, in which the electric machine presents a stator with slots creating lateral slot openings in the stator and having a slot depth, and in which the conductor rails are placed at one or both face sides of the stator in the direction of the slot depth below the slot openings.

3. The winding arrangement of claim 1, in which a plurality of conductor rails is arranged next to one another and connected with a conductor rail set.

4. The winding arrangement of claim 1, in which at least one conductor rail is composed of individual ring sectors.

5. The winding arrangement of claim 1, in which the winding is composed of structural parts.

6. The winding arrangement of claim 5, in which the conductor rails are directly connected with structural parts of the coils.

7. The winding arrangement of claim 2, in which the ends of the coils or coil groups connected with the conductor rails are all arranged in the direction of the slot depth and at the same side of the slot opening as the conductor rails.

8. The winding arrangement of claim 2, in which the slots run in a lateral direction, and a plurality or all of the conductor rails is/are layered next to each other in the lateral direction of the slots.

9. The winding arrangement of claim 8, in which at least one conductor rail comprises elevations connecting the coil ends on the side facing the slot openings.

10. The winding arrangement of claim 2, in which a plurality or all of the conductor rails is/are layered on top of one another in the direction of the slot depth.

11. The winding arrangement of claim 8, in which a star point rail presents links extending across the conductor rails and connecting coil ends.

12. The winding arrangement of claim 10 having a star point rail, and in which the star point rail presents links extending across the conductor rails and connected with coil ends.

13. The winding arrangement of claim 1, in which at least two coils are connected in series, and the serial connection is created with connections between the coils connected in series, and in which at least some connection create sectors which are insulated from each other.

14. The winding arrangement of claim 1, in which the electric machine presents a stator with face sides and slots;

the winding presents several overlapping coils comprising of the slot bars located in the slots and connector lines located at the face sides of the stator; and the connector lines are flatter than the slot bars and the connector lines of overlapping coils are staggered and therefore layered.

* * * * *